US008998776B2

United States Patent
Teal et al.

(10) Patent No.: US 8,998,776 B2
(45) Date of Patent: Apr. 7, 2015

(54) LOAD WHEEL FOR A SELF-PROPELLED EXERCISE DEVICE

(75) Inventors: Brent C. Teal, Solana Beach, CA (US); Bryan L. Pate, Atherton, CA (US)

(73) Assignee: PT Motion Works, Inc., Solana Beach, CA (US)

( * ) Notice: Subject to any disclaimer, the term of this patent is extended or adjusted under 35 U.S.C. 154(b) by 1027 days.

(21) Appl. No.: 13/074,371

(22) Filed: Mar. 29, 2011

(65) Prior Publication Data

US 2011/0245042 A1    Oct. 6, 2011

Related U.S. Application Data

(60) Provisional application No. 61/319,713, filed on Mar. 31, 2010.

(51) Int. Cl.
*A63B 24/00* (2006.01)
*F16C 27/06* (2006.01)
*A63B 22/06* (2006.01)
*A63B 22/20* (2006.01)

(52) U.S. Cl.
CPC ......... *F16C 27/066* (2013.01); *Y10T 74/20528* (2015.01); *A63B 22/0664* (2013.01); *A63B 22/20* (2013.01); *A63B 22/203* (2013.01); *A63B 2022/067* (2013.01)

(58) Field of Classification Search
USPC ........ 482/51, 52, 57, 66–68, 70, 71; 280/221, 280/252, 253, 256
See application file for complete search history.

(56) References Cited

U.S. PATENT DOCUMENTS

| | | | | |
|---|---|---|---|---|
| 4,456,276 A | * | 6/1984 | Bortolin | 280/257 |
| 5,224,724 A | * | 7/1993 | Greenwood | 280/221 |
| 5,527,246 A | | 6/1996 | Rodgers, Jr. | |
| 6,165,107 A | * | 12/2000 | Birrell | 482/70 |
| 6,485,041 B1 | | 11/2002 | Janssen | |
| 6,648,353 B1 | | 11/2003 | Cabal | |
| 6,659,486 B2 | | 12/2003 | Eschenbach | |
| 6,663,127 B2 | | 12/2003 | Miller | |
| 8,419,598 B2 | * | 4/2013 | Dyer et al. | 482/70 |
| 2008/0116655 A1 | | 5/2008 | Pate | |
| 2010/0230925 A1 | * | 9/2010 | Thielbar | 280/221 |

FOREIGN PATENT DOCUMENTS

| | | |
|---|---|---|
| CA | 2670278 | 5/2008 |
| JP | 2000-053065 | 2/2000 |
| JP | 3087087 | 4/2002 |
| JP | 2006-125624 | 5/2006 |
| JP | 2006-314537 A | 11/2006 |
| WO | 2011123542 A2 | 10/2011 |

OTHER PUBLICATIONS

Notification, International Search Report and Written Opinion dated Oct. 6, 2011 for PCT/US2011/30540.

* cited by examiner

*Primary Examiner* — Glenn Richman
(74) *Attorney, Agent, or Firm* — Stephen C. Beuerle; Procopio Cory Hargreaves & Savitch LLP

(57) ABSTRACT

A rotational bearing has an outer surface and an outer layer attached to the outer surface of the bearing by overmolding, bonding or mechanical fasteners. The outer layer has an outer surface which rotatably engages a bearing surface of a track along which the bearing device is adapted to travel, and is of a material softer than the material of the track bearing surface, such as a polymer or a relatively soft metal. In one example, the bearing is rotatably attached to a foot link carrying a foot engaging platform of a human powered conveyance or exercise system.

20 Claims, 3 Drawing Sheets

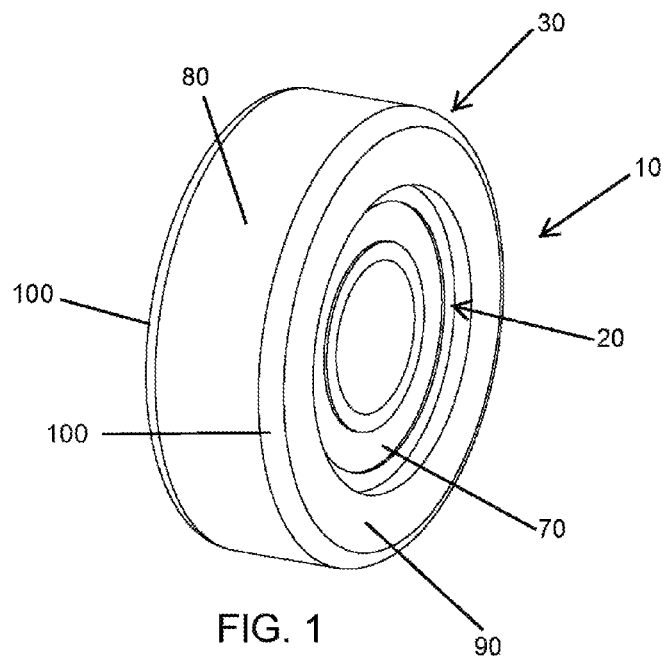
FIG. 1
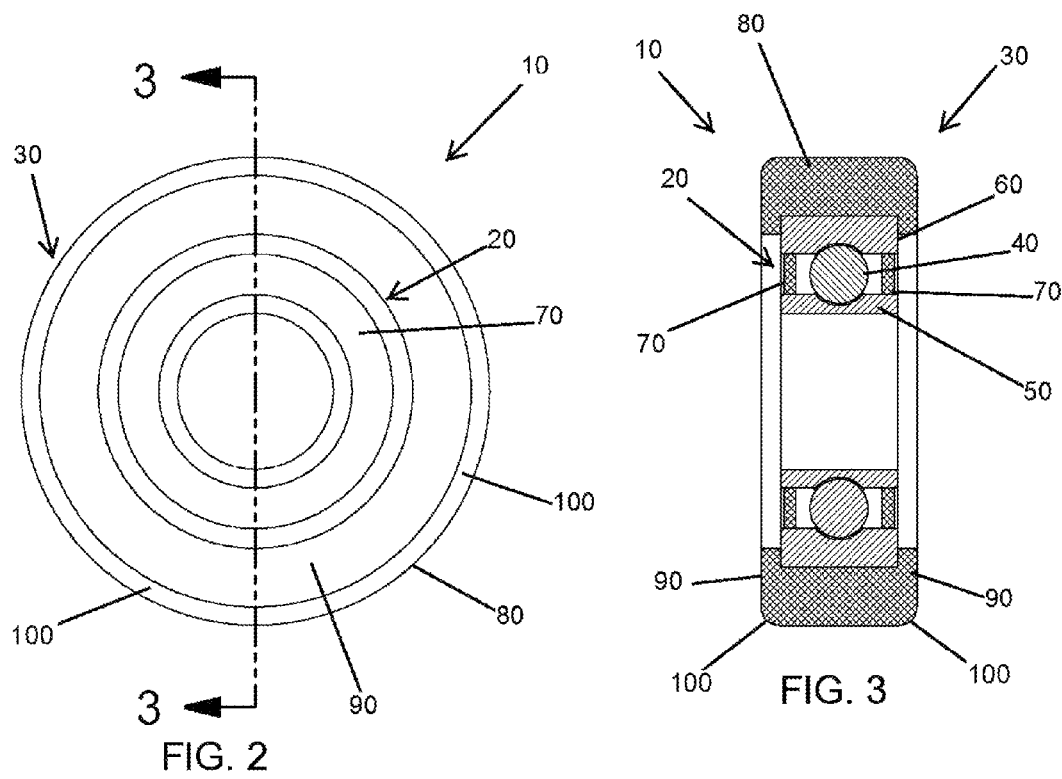
FIG. 2
FIG. 3

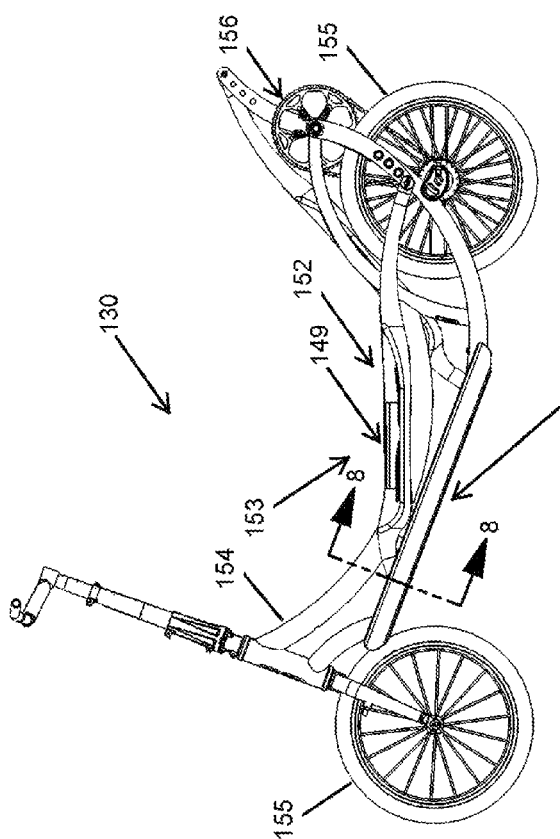
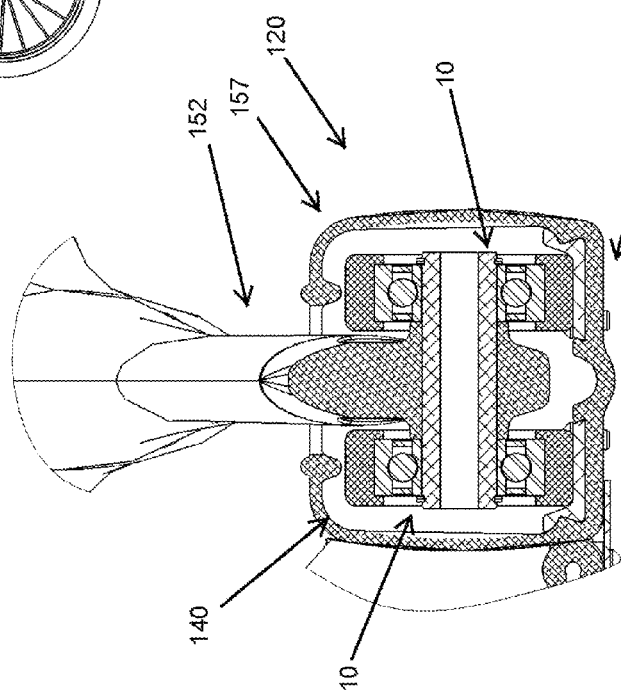

LOAD WHEEL FOR A SELF-PROPELLED EXERCISE DEVICE

RELATED APPLICATION

The present application claims the benefit of U.S. provisional patent application No. 61/319,713 filed Mar. 31, 2010, which is incorporated herein by reference in its entirety.

BACKGROUND

1. Field of the Invention

The present invention relates generally to self-propelled exercise devices, and particularly to load wheels that reciprocate along guide tracks of such devices.

2. Related Art

U.S. Published Patent Application No. 2008/0116655 which is incorporated herein by reference in its entirety, as well as U.S. Pat. No. 6,663,127, both disclose a self-propelled exercise device propelled by a drive train in which a user's feet are placed on foot platforms and the user strides forward and rearward to propel the device and thereby derive benefits from exercise. The foot platforms are connected to foot links which are coupled to one or more respective load wheels that reciprocate along guide tracks coupled to the cycle frame. The arrangement is such that the operator's feet travel along closed, reciprocating paths during the pedal stroke. The reciprocating paths may be elliptical or at least partially elliptical in some cases, or may include some circular components.

There are problems in creating a space efficient, low friction, low weight, robust, and inexpensive means for enabling the front end of the foot links of a self-propelled exercise device to reciprocate during the pedal stroke. Alternate approaches are to use a multi-bearing wheel, a bare rotational bearing or various linear bearings.

Using a multi-bearing load wheel would be inferior for numerous reasons. These include making the track system significantly wider, which would increase the weight and cost of the frame and expand the width of the self-propelled exercise device; and increasing the cost and weight of each load wheel because of the additional bearing.

Using a single bare rotational bearing would also be inferior because the load wheel system requires at least one element to provide compliance. Using a bare bearing would require the system to achieve compliance on the track side of the load wheel interface. High-performance self-propelled exercise devices require a track length of at least 14 inches and on some devices the track length can exceed 28 inches. Therefore, covering the track surfaces with a compliant material would require significantly more of the compliant material to be used and would increase the cost and weight of the track system.

A linear bearing, which utilizes recirculating ball bearings, requires a very hard track or rail, which results in a system that is heavier, more expensive and less tolerant to debris and shock loading. A plain polymer linear bearing without rolling elements would be much less efficient than the proposed invention.

SUMMARY

An aspect of the invention involves a single bearing to provide a space efficient, high-capacity, low friction interface on a self-propelled exercise device.

Another aspect of the invention involves a load wheel for a self-propelled exercise device. The load wheel includes a single rotational bearing (e.g., a needle bearing, radial ball bearing, plain bearing or angular contact bearings) with an outer layer of a first material which is softer than a second material of a track bearing surface on which the load wheel travels. The first material may be a wearable material such as a compliant polymer material or a soft metal attached to an outside of the single rotational bearing. The outer layer may be overmolded onto the outer surface of the bearing, or may be mechanically attached or attached through a bonding process or agent. This results in a very high capacity and low-friction wheel that may be disposed into a very small cavity. It also results in a wheel that is comprised of a single bearing (as opposed to a dual bearing wheel), which enables a reduction in parts, minimization of space, cost savings, and weight reduction. Using a bearing alone does not suffice because a wearable compliant surface with a high load capacity is needed. Compliance is important in the system in order to minimize or reduce the stresses at the wheel-track interface and improve the tolerance to debris, both of which may enable a longer service life. A compliant load wheel also allows for the use of a lighter weight material for the track due to the lower stresses. Additionally, compliance is important for making the track system quieter. Implementing the compliance on the track side would require the use of more material because it would have to be a long thick track, which would increase weight and cost and take up more space.

The disclosed invention provides a space efficient means of achieving a light, low-friction, high-capacity load wheel to enable the forward end of a foot link of a self-propelled exercise device to reciprocate along the guide tracks. Previous systems have included dual-bearing systems that were larger, heavier, and more expensive to manufacture.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 is perspective view of an embodiment of a load wheel or bearing device for a self-propelled exercise device;

FIG. 2 is a front elevational view of the load wheel of FIG. 1;

FIG. 3 is a cross-sectional view of the load wheel taken along lines 3-3 of FIG. 2;

FIG. 7 is a side-elevational view of an embodiment of a self-propelled exercise device that utilizes one or more of the load wheel(s) of FIGS. 1 to 3 or 4 to 6; and FIG. 8 is a cross-sectional view of an internal guide track system of the apparatus of FIG. 7 taken along lines 8-8 of FIG. 7 and shows one embodiment of a load wheel and internal track arrangement.

DETAILED DESCRIPTION

Figure 4:
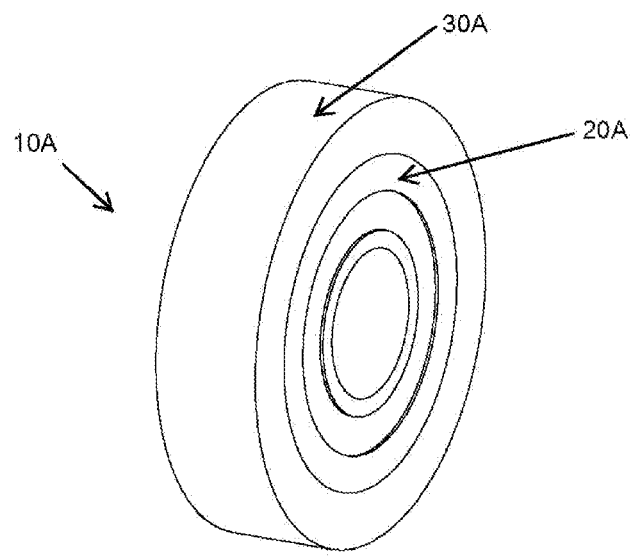
FIG. 4 is perspective view of another embodiment of a load wheel for a self-propelled exercise device.

Certain embodiments as disclosed herein provide for a bearing or load wheel having a compliant outer layer of polymer material or the like to provide a low friction interface on a drive train of a human-powered cycle or exercise device.

After reading this description it will become apparent to one skilled in the art how to implement the invention in various alternative embodiments and alternative applications. However, although various embodiments of the present invention will be described herein, it is understood that these embodiments are presented by way of example only, and not limitation.

FIGS. 1-3 illustrate one embodiment of a bearing device or load wheel 10. The device 10 functions as a load wheel that is connected via a foot link to a foot platform, for example as described below in connection with FIGS. 7 and 8. The load wheel 10 reciprocates along a guide track of a frame of a self-propelled exercise device, which is sometimes referred to as an "elliptical" bicycle or cycle. It should be understood that the term "elliptical" as used herein is not limited to cycles in which the pedaling profile is purely elliptical, but also covers cycles having other closed paths of pedaling motion, including non-elliptical or only partially elliptical profiles. Similarly, it should be understood that the invention is not limited to use with devices having two wheels rotatably coupling the frame to the ground, but is just as applicable for self-propelled exercise devices with three or more wheels coupling the frame to the ground. Example self-propelled exercise devices are described in U.S. Published Application 2008/0116655, which is incorporated herein by reference in its entirety, as well as in U.S. Pat. No. 6,663,127.

The bearing device or load wheel 10 includes a single rotational bearing 20 with an outer layer 30 attached to an outside of the single rotational bearing 20. The outer layer 30 is of a material which is softer than the material of a guide track bearing surface along which the rotational bearing 20 travels, and is also softer than the material of the rotational bearing 20. In one embodiment, the outer layer is of a compliant, wearable material and may be made from any polymer, including but not limited to nylon, polyurethane, polyoxymethylene (POM), polyethylene, polyvinyl chloride (PVC), polytetrafluoroethylene (PTFE), polyethylene terephthalate (PET), polyetheretherketone (PEEK), polypropylene, silicone, and rubber. Alternatively, the layer 30 may be of a metal which is softer than the material of the track bearing surface and the material of the rotational bearing, such as aluminum, bronze, brass or magnesium.

In the embodiment shown, the single rotational bearing 20 is a radial ball bearing. In alternative embodiments, the single rotational bearing 20 may be, for example, but not by way of limitation, a needle bearing, a plain bearing, or angular contact bearings. In the radial ball bearing embodiment of the single rotational bearing 20 shown in FIGS. 1-3, the single rotational bearing 20 includes a single line/plane of a plurality of annular-aligned steel balls 40. The balls 40 are disposed between an inner race 50, an outer race 60, and opposite annular side walls 70.

In one embodiment, the member or outer layer 30 is attached to an outside of the outer race 60 by overmolding, but may be attached by mechanical fasteners or by bonding in alternative embodiments. The outer layer 30 is of a compliant, wearable material and may be a polymer material similar or identical to the polymer materials used for plain polymer linear bearings. As illustrated in FIG. 3, the outer layer 30 is an annular member with an outer surface which includes a tread 80, an inner surface, and opposite side rims 90 joined by opposite rounded edges 100. In the embodiment of the overmolded polymer bearing 10 shown in FIGS. 1-3, the opposite side rims 90 mechanically secure the member 30 to the single rotational bearing 20 and prevent the single rotational bearing 20 from detaching/separating from the polymer member 30.

Figure 5:
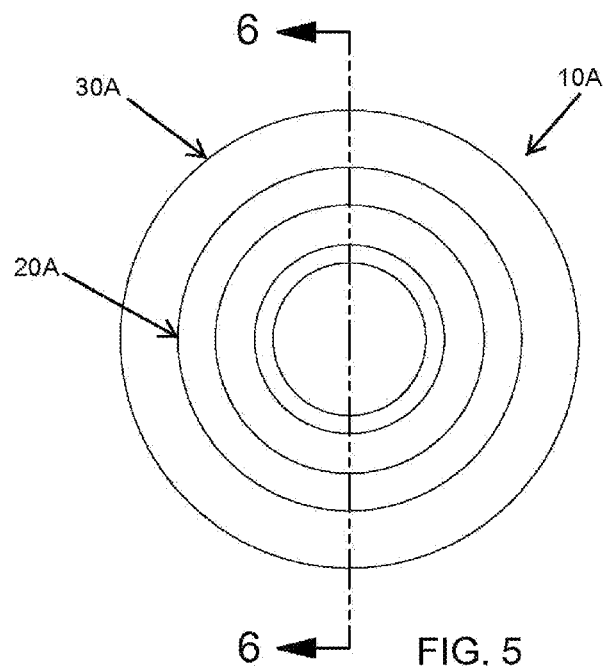
FIG. 5 is a front elevational view of the load wheel of FIG. 4.
Figure 6:
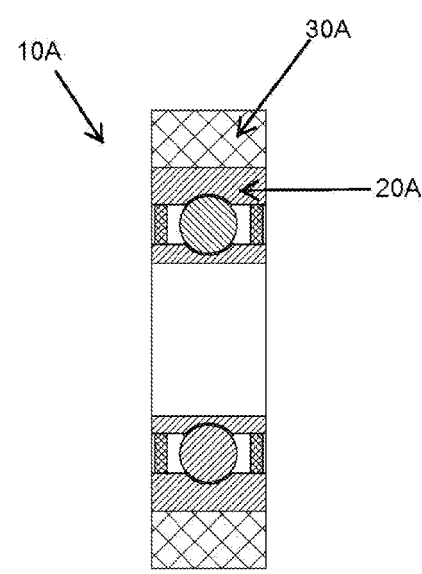
FIG. 6 is a cross-sectional view of the load wheel taken along lines 6-6 of FIG. 4.

With reference to FIGS. 4-6, in an alternative embodiment of polymer member or bearing 10A, the inner surface of polymer member 30A is adhered to an outer periphery of the single rotational bearing 20A (without opposite side rims 90) through a bonding process or agent or by an overmolding process.

FIGS. 7 and 8 illustrate a self-propelled exercise device 130 which generally includes a pair of foot link assemblies 153 which reciprocate on a guide track system 120 located on a cycle frame or frame structure 154 on which a pair of wheels 155 (front and rear wheel) are rotatably mounted. Each foot link assembly 153 has a foot link 152 and a foot platform 149 designed for engagement by an operator's foot. Each foot link assembly is coupled to a foot link guide track 150 at one end and rotatably coupled to a crank assembly 156 at the opposite end. Pedaling motion of an operator engaging the foot link platforms in reciprocating paths drives the rear wheel and propels the device. The shape of the pedaling paths may be generally elliptical or generally circular, and the drive train of the apparatus is designed to produce a generally elongate, closed pedaling profile for each foot which emulates a natural human running or walking motion. The self-propelled exercise device of FIG. 7 has two rotatably coupled wheels supporting the frame on the ground, but may have three, four, or more wheels in other embodiments.

FIG. 8 is a cross-sectional view which illustrates one embodiment of an internal guide track system 120 of a self-propelled exercise device 130 taken along lines 8-8 of FIG. 7. In this embodiment, the internal guide track system 120 for each foot link 152 includes a track 150 coupled to the frame 154 and two side-by-side load wheels 10 which travel back and forth along the track 150 and are rotatably secured to the end of a foot link 152 via a foot link coupler 140. In alternative embodiments, a foot link coupler 140 can include one load wheel or multiple load wheels 10 (e.g., 1, 2, 3, 4, 5, etc.). As illustrated in FIG. 8, the internal guide track system has an upper wall with an opening through which an end portion of foot link 152 extends and the load wheels 10 are rotatably mounted on opposite sides of the end portion, and are a close, rolling fit within the guide track cavity.

The load wheel 10 described above functions as a very high capacity and low-friction load wheel that may be disposed into a very small cavity, such as the internal cavity of an internal guide track system 157 as illustrated in FIG. 8. The internal guide track system 157 may be the same as internal guide track system 100 shown in U.S. Patent Application Publication No. 2010/0295263, which is incorporated by reference herein in its entirety, or a similar guide track system. The load wheel 10 disclosed herein is comprised of a single bearing (as opposed to a dual bearing wheel), which enables a reduction in parts, minimization of space, cost savings, and weight reduction. Using a bearing alone as a load wheel does not suffice because a wearable compliant surface with a high load capacity is needed. The polymer outer layer of load wheel 10 provides the important compliance in the system to minimize or reduce the stresses at the wheel-track interface and improve the tolerance to debris, both of which enable a longer service life. A compliant load wheel also allows for the use of a lighter weight material for the track due to the lower stresses. Additionally, compliance is important for making the track system quieter. Implementing the compliance on the track side would require the use of more material because it would have to be a long thick track, which would increase weight and cost and take up more space. The load wheel disclosed herein 10 provides a space efficient means of achieving a light, low-friction, high-capacity load wheel to enable the forward end of the foot link to reciprocate along the guide tracks.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A drive-train system for a self-propelled exercise device, comprising:
   at least one elongated guide track having a bearing surface;
   a foot link associated with a foot engaging platform; and
   at least one load wheel rotatably connected to the foot link and configured for reciprocating movement along the guide track;
   the at least one load wheel comprising a rotational bearing having an outer surface and an outer layer of a first material secured to the outer surface and rotatably engaged with the bearing surface of the track, the bearing surface being of a second material and the first material being softer than the second material.

2. The system of claim 1, wherein the at least one load wheel comprises first and second load wheels each rotatably connected to the foot link and rotatably engaged with the bearing surface of the track, each load wheel comprising a rotational bearing having an outer surface and an outer layer of the first material secured to the outer surface.

3. The system of claim 1, wherein the load wheel comprises a radial ball bearing having an annular inner race, an annular outer race, and a plurality of metal balls rotatably mounted between the inner and outer race, and the outer layer of compliant material is coupled to the outer race.

4. The bearing device of claim 3, wherein the outer layer comprises an annular member having an inner surface secured to the outer race, opposite side faces, and an outer surface comprising a tread.

5. The bearing device of claim 4, wherein the opposite side faces of the annular member include opposite side rims projecting inwardly from the inner surface on opposite sides of the member, the bearing has opposite annular side walls, and the side rims extend over at least part of the respective opposite annular side walls and are secured to the opposite side walls.

6. The system of claim 1, wherein the first material is a polymer material.

7. The system of claim 6, wherein the polymer material is overmolded onto the outer surface of the bearing.

8. The system of claim 1, wherein the first material is a metal.

9. The system of claim 1, wherein the outer layer is mechanically attached to the outer surface of the bearing.

10. The bearing device of claim 1, wherein the outer layer is bonded to the outer surface of the bearing.

11. The bearing device of claim 1, wherein the rotational bearing is selected from the group consisting of a radial ball bearing, a needle bearing, a plain bearing, and angular contact bearings.

12. The bearing device of claim 1, wherein the guide track is an internal guide track defining an internal cavity and the load wheel is rotatably engaged in the internal cavity.

13. A self-propelled exercise device, comprising:
   a frame having a drive wheel rotatably supported thereupon and a first pivot axis defined thereupon;
   a first and a second foot link, each having a front end, a rear end, a foot receiving portion defined thereupon disposed between said front and rear ends, and at least one load wheel rotatably coupled to said front end;
   a coupler assembly which is in mechanical communication with said first pivot axis and with a rear end of each of said first and second foot links, said coupler assembly being operative to direct said rear ends of said foot links in an arcuate path of travel; and
   at least one elongated guide track coupled to the frame and to said at least one load wheel, said guide track comprising a bearing surface and being operative to direct said at least one load wheel along said bearing surface in a reciprocating path of travel,
   wherein said at least one load wheel includes a rotational bearing having an outer surface and an outer layer of a first material secured to the outer surface and rotatably engaged with said bearing surface of said guide track, said bearing surface being of a second material and the first material being softer than the second material.

14. The apparatus of claim 13, further comprising a power transfer linkage in mechanical communication with said coupler assembly and with said drive wheel; whereby when the rear end of one of said foot links travels in said arcuate path and the at least one load wheel coupled to that foot link travels in said reciprocating path, an operator's foot supported thereupon travels in a generally elliptical path of travel, and said power transfer linkage transfers power from said coupler assembly to said drive wheel, so as to supply propulsive power thereto.

15. The apparatus of claim 14, wherein said at least one guide track is an internal guide track defining an internal cavity having an upper wall with an opening, and the front end of each foot link extending through the opening, whereby said at least one load wheel is rotatably engaged in the internal cavity between the upper wall and the track bearing surface.

16. The system of claim 15, wherein said at least one load wheel comprises a first and a second spaced load wheel, each rotatably coupled to said front end of said foot link and rotatably engaged with said guide track bearing surface, each load wheel comprising a rotational bearing having an outer surface and an outer layer of the first material secured to the outer surface.

17. The system of claim 16, wherein said load wheel comprising a radial ball bearing having an annular inner race, an annular outer race, and a plurality of metal balls rotatably mounted between the inner and outer race, and the outer layer is coupled to the outer race.

18. The bearing device of claim 17, wherein the outer layer comprises an annular member having an inner surface secured to the outer race, opposite side faces, and an outer surface comprising a tread.

19. The bearing device of claim 17, wherein the opposite side faces of the annular member include opposite side rims projecting inwardly from the inner surface on opposite sides of the member, the bearing has opposite annular side walls, and the side rims extend over at least part of the respective opposite annular side walls and are secured to the opposite side walls.

20. The system of claim 13, wherein the first material is a compliant polymer material.

* * * * *